United States Patent
Ashar et al.

(10) Patent No.: US 10,690,722 B1
(45) Date of Patent: Jun. 23, 2020

(54) METHODS AND SYSTEMS FOR EFFICIENT IDENTIFICATION OF GLITCH FAILURES IN INTEGRATED CIRCUITS

(71) Applicant: Pranav Ashar, Belle Mead, NJ (US)

(72) Inventors: Pranav Ashar, Belle Mead, NJ (US); Fabrice Baray, Sunnyvale, CA (US); Hari Mony, Cedar Park, TX (US); Nikhil Rahagude, San Jose, CA (US); Vikas Sachdeva, Bengaluru (IN)

(73) Assignee: Real Intent, Inc., Sunnyvale, CA (US)

( * ) Notice: Subject to any disclaimer, the term of this patent is extended or adjusted under 35 U.S.C. 154(b) by 2 days.

(21) Appl. No.: 16/271,265

(22) Filed: Feb. 8, 2019

(51) Int. Cl.
*G06F 30/30* (2020.01)
*G01R 31/317* (2006.01)
(Continued)

(52) U.S. Cl.
CPC ......... *G01R 31/3177* (2013.01); *G06F 30/33* (2020.01); *G06F 30/3308* (2020.01);
(Continued)

(58) Field of Classification Search
CPC . G01R 31/3177; G06F 30/33; G06F 30/3308; G06F 30/3312; G06F 30/3315; G06F 2111/00; G06F 2119/22
See application file for complete search history.

(56) References Cited

U.S. PATENT DOCUMENTS

| | | | |
|---|---|---|---|
| 5,903,577 A * | 5/1999 | Teene ................... | G06F 30/3312 714/724 |
| 7,222,324 B1 * | 5/2007 | Kaszynski ............. | G06F 30/34 716/113 |

(Continued)

Primary Examiner — Stacy Whitmore

(57) ABSTRACT

Methods and systems are described to efficiently identify the potential for failures in integrated circuits (ICs) caused by glitches. In an IC based on synchronous operation, the operation of the multiplicity of inputs, storage elements and observed outputs in said IC are synchronized to one or more clocks that determine the specific times at which inputs change, outputs are observed, and stored values are updated. Almost all ICs are based on synchronous operation. When input values to a logic circuit in an IC change, the effects of said changes propagate through paths in said logic circuit in a delayed manner such that each of said paths may have a different delay. Said different delays can cause a wire in a logic circuit to have transient values (termed "glitch") before settling to a final value consistent with the input values being applied to said logic circuit. An IC is likely to function erroneously, referred to as having a "glitch failure", when a glitch value is observed at an output or captured by a storage element. Glitch failures are difficult and expensive to diagnose in a manufactured IC. To raise the productivity of IC development, it is imperative that any potential glitch failure in an IC be detected prior to manufacture. Said detection is hard because a typical IC has a very large number of logic circuits to analyze for glitch failure. To be practical, said analysis must have high performance and high accuracy. Said high performance requiring that said analysis should complete in acceptable run time even for the largest ICs. Said high accuracy requires that said analysis should identify all potential for glitch failure (100% recall), and minimize the number of logic circuits erroneously reported as having glitch failure potential (high precision). Whereas the glitch phenomenon, the potential for glitch failure and methods for detecting glitch failures in pre-manufacture IC models are well known, achievement of high performance with high accuracy has not yet been addressed in prior art. Whereas conventional methods for glitch checking are inefficient and insufficiently accurate, the methods and systems described in the present invention achieve new levels of performance, scalability and accuracy in said detection of glitch failures in an IC. Said methods and systems are based on a novel dissection of glitch-checking requirements into a (Continued)

System for Large-Scale Glitch Analysis multiplicity of individual steps, which said steps executed in a systematic sequence deliver high performance and accuracy.

16 Claims, 9 Drawing Sheets

(51) Int. Cl.
*G01R 31/3177* (2006.01)
*G06F 30/33* (2020.01)
G06F 30/3315 (2020.01)
G06F 111/00 (2020.01)
G06F 30/3308 (2020.01)
G06F 30/3312 (2020.01)
G06F 119/22 (2020.01)

(52) U.S. Cl.
CPC ...... *G06F 30/3312* (2020.01); *G06F 30/3315* (2020.01); *G06F 2111/00* (2020.01); *G06F 2119/22* (2020.01)

(56) References Cited

U.S. PATENT DOCUMENTS

| | | | |
|---|---|---|---|
| 7,236,919 B2* | 6/2007 | Fulkerson | G06F 30/367 703/16 |
| 9,965,575 B2* | 5/2018 | Ashar | G06F 30/331 |
| 2007/0265820 A1* | 11/2007 | Kampf | G06F 30/33 703/14 |
| 2007/0288822 A1* | 12/2007 | Lin | G01R 31/3177 714/741 |
| 2009/0172612 A1* | 7/2009 | Kanamaru | G06F 30/33 716/136 |
| 2012/0174049 A1* | 7/2012 | Lin | G06F 30/20 716/113 |
| 2016/0370429 A9* | 12/2016 | Mazzawi | G06F 30/20 |
| 2017/0053051 A1* | 2/2017 | De | G06F 30/30 |
| 2017/0364620 A1* | 12/2017 | Meil | G06F 30/3312 |
| 2018/0045780 A1* | 2/2018 | Lin | G01R 31/318328 |
| 2018/0356810 A1* | 12/2018 | Hofig | G06F 30/17 |
| 2018/0364306 A1* | 12/2018 | Pillay | G06F 30/3323 |
| 2019/0138677 A1* | 5/2019 | Peng | G06F 30/33 |

* cited by examiner

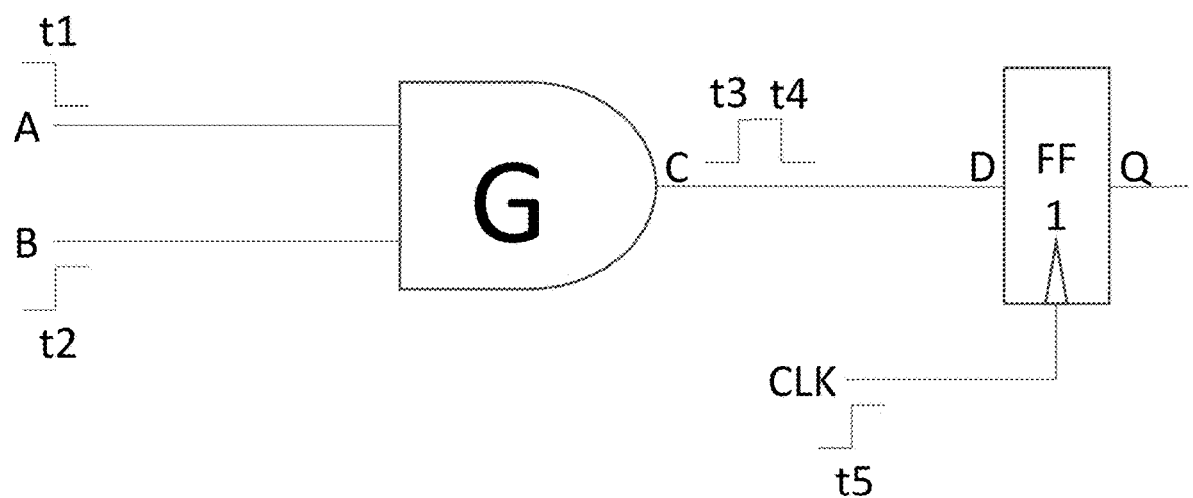
FIG. 1 Glitch Example

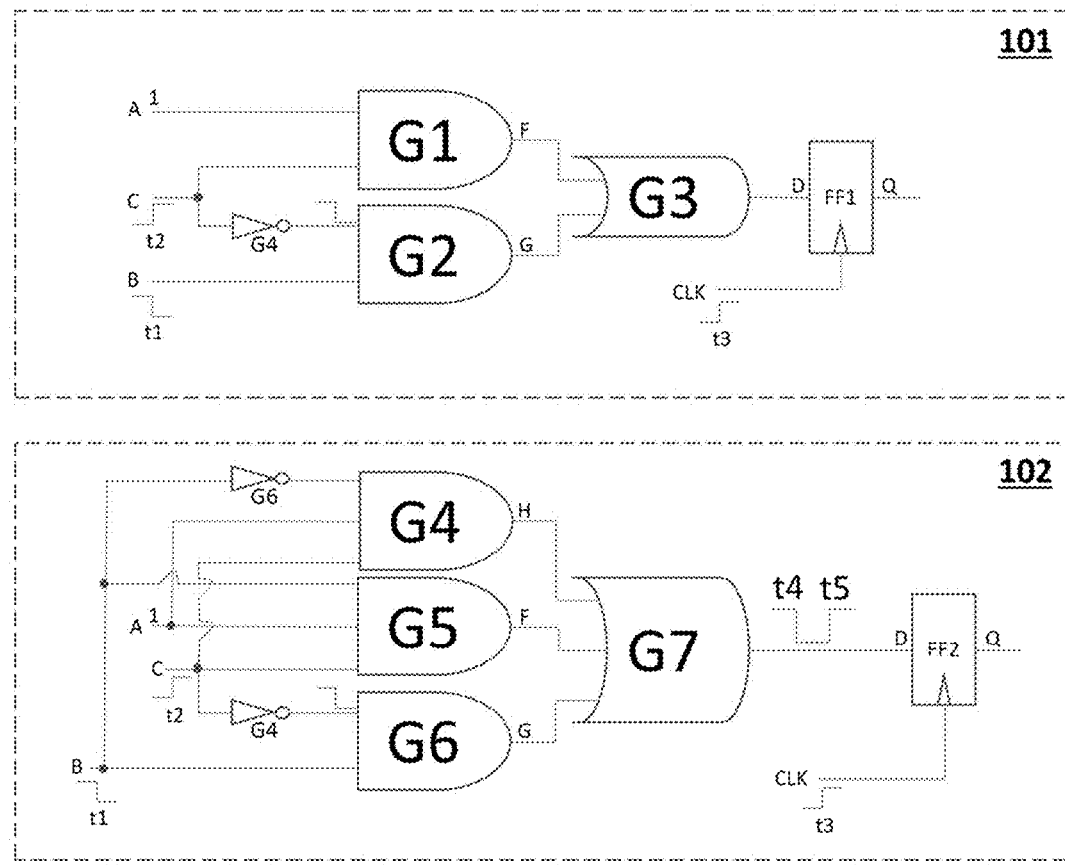
FIG. 2 Example Showing that Glitch is Logic-Structure Dependent

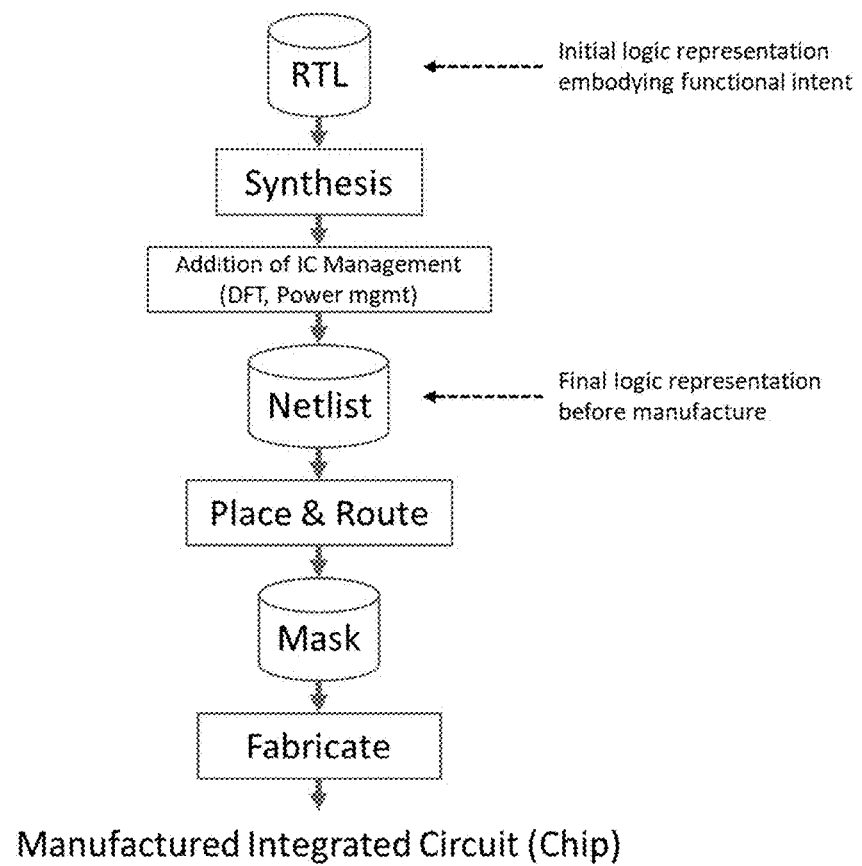
FIG. 3 Outline of Major Steps in Integrated Circuit Realization

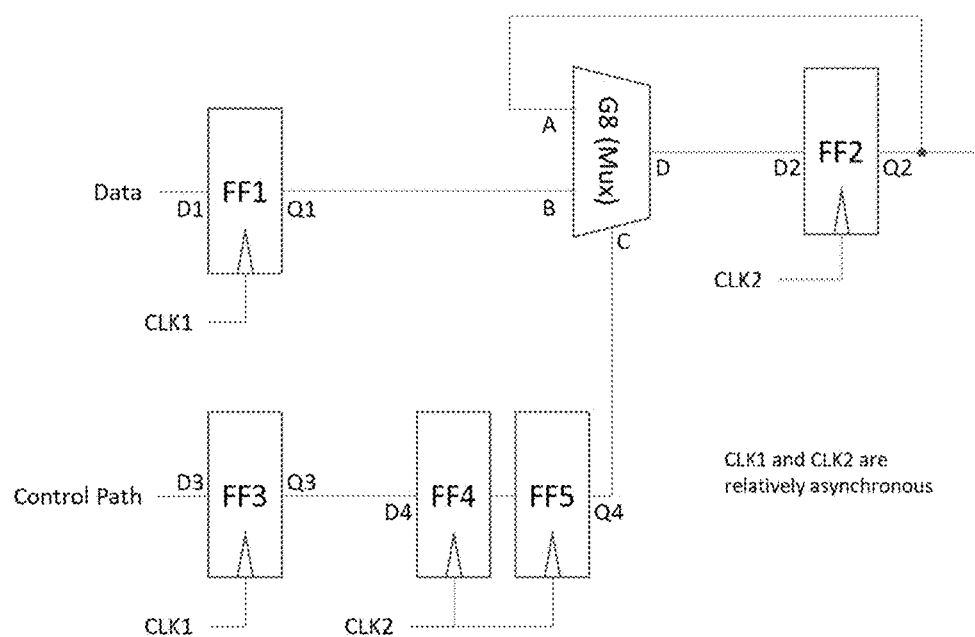
FIG. 4 Untimed Path Due to Asynchronous Clock-Domain Crossing

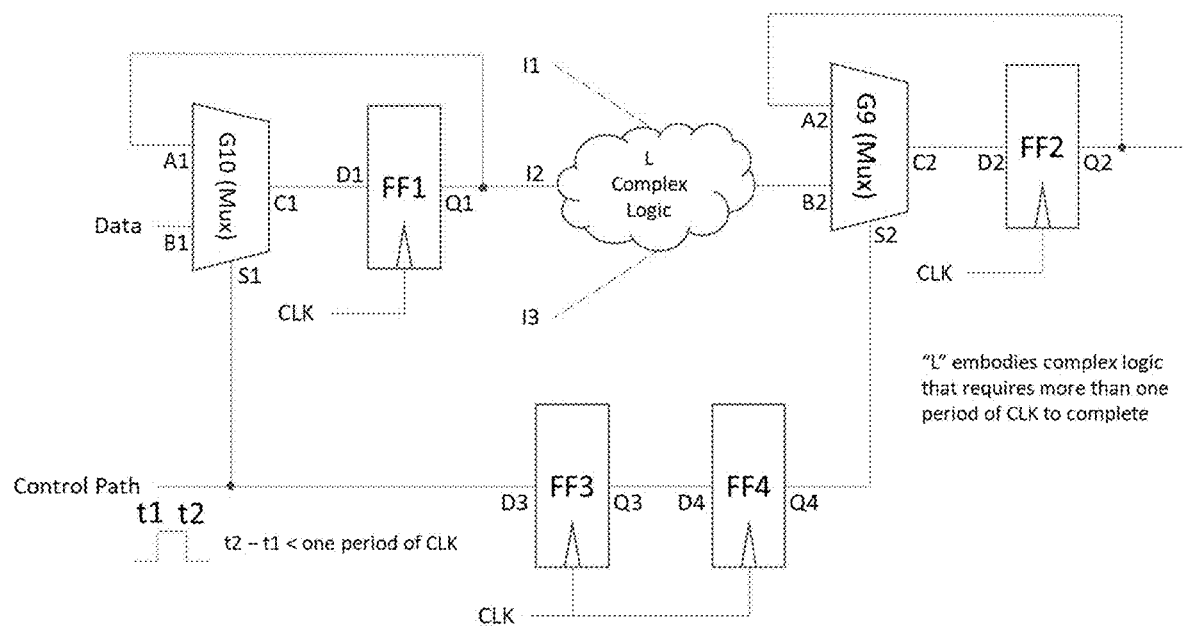
FIG. 5  Untimed Path Due to Multi-Cycle Exception

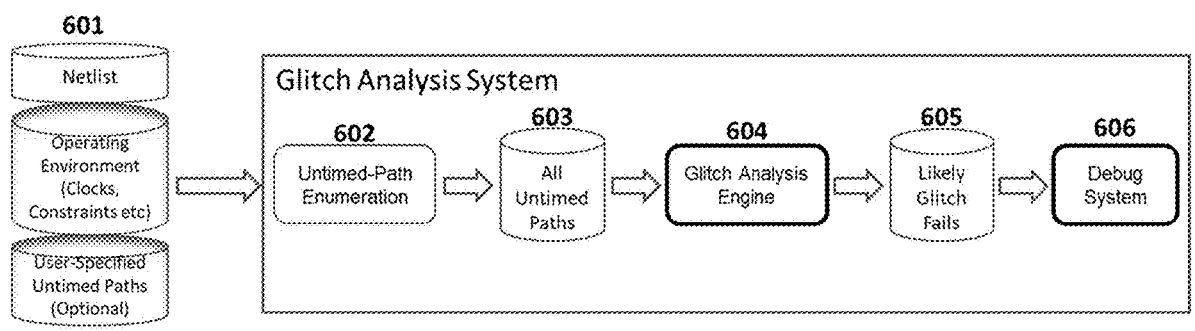
FIG. 6 System for Large-Scale Glitch Analysis

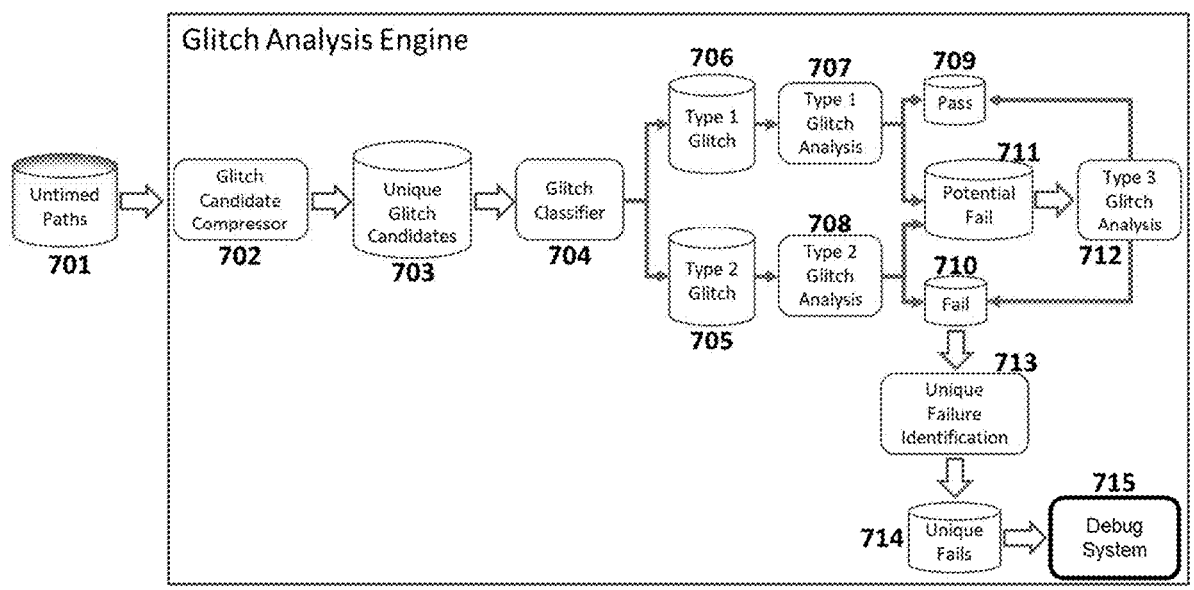
FIG. 7 High-Throughput Glitch Analysis Engine

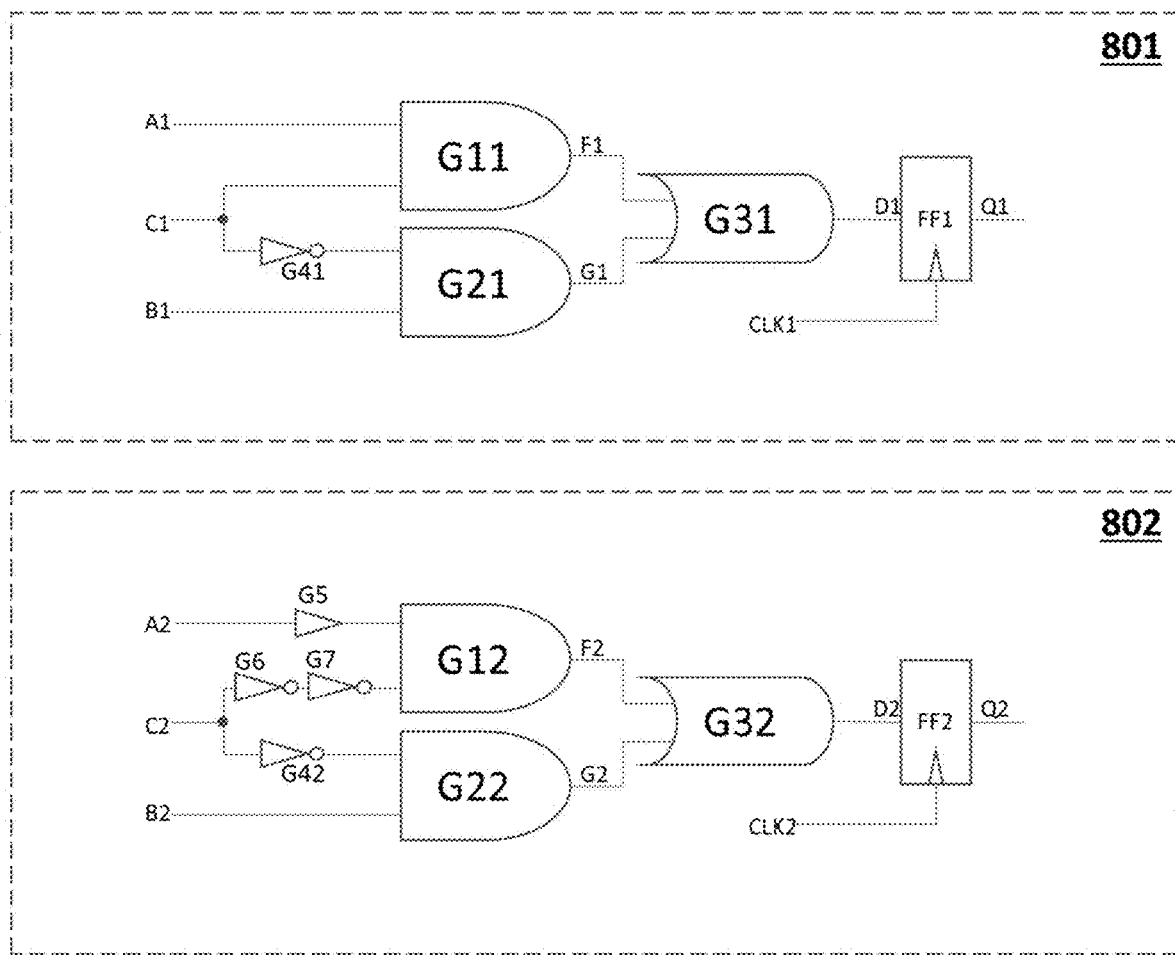
FIG. 8 Example Showing a Pair of Isomorphic Logic Circuits

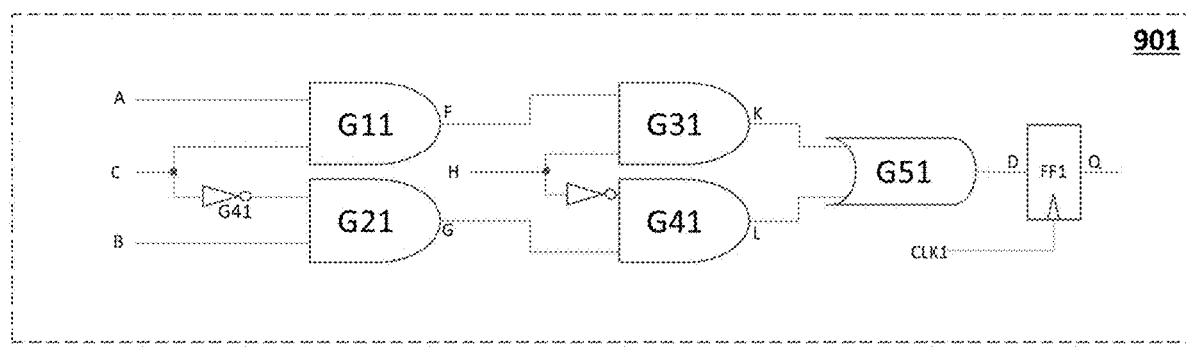
FIG. 9  Example of Glitch-Free Non-Unate Logic Cone

METHODS AND SYSTEMS FOR EFFICIENT IDENTIFICATION OF GLITCH FAILURES IN INTEGRATED CIRCUITS

CROSS REFERENCE TO PRIOR-FILED APPLICATIONS

None.

REFERENCES CITED

U.S. Pat. Documents

U.S. Pat. No. 4,787,062
U.S. Pat. No. 6,324,679
U.S. Pat. No. 6,377,065
U.S. Pat. No. 9,721,057
2005/0270073
2007/0165838
2013/0129116
2014/0325463
2018/0225400.

Other References

M. Yoeli and S. Rinon, "Application of ternary algebra to the study of static hazards", *J. ACM*, pp. 11 (1):84-97, January 1964.
E. B. Eichelberger, "Hazard detection in combinational and sequential switching circuits", IBM J. Res. Develop., pp. 9:90-99, 1965.
J. Beister. A unified approach to combinational hazards. IEEE Trans. Computers, C-23 (6):566-575, June 1974.
D. S. Kung. Hazard-non-increasing gate-level optimization algorithms. ICCAD'92, pp. 631-634, November 1992.
Jeong et al., "Fast Hazard Detection in Combinational Circuits", The Design Automation Conference, pp. 592-595, June 2004.
J. R. Ullmann, "An Algorithm for Subgraph Isomorphism", *J. Assoc. for Computing Machinery*, vol. 23, pp. 31-42, 1976.

FIELD OF INVENTION

The design and manufacture of an integrated circuit (IC) is an extremely complex and expensive endeavor. It is imperative that the risk of functional failure of the manufactured IC be minimized. Said imperative is a significant challenge given the complexity of an IC in terms of number of active components it encapsulates and the functional complexity of its implementation. The present invention addresses a mode of failure in an IC that is catastrophic in terms of the viability of said IC, which said mode of failure thus far, using any available method in the prior art, being extremely difficult to detect in a pre-manufacture model of an IC. The present invention specifically addresses the efficiency and accuracy of detecting the potential for said failure mode in a pre-manufacture model of an IC.

The failure mode addressed by the present invention is specifically the failure of an IC because of glitches, which are transient value changes on signals in an IC that cause said IC to function erroneously. Failures caused by glitches are extremely difficult to detect with accuracy and efficiency. The present invention presents methods of sign-off level accuracy and extremely high efficiency applied on a pre-manufacture model of an IC that enable the complete elimination of a risk of glitch failures in a manufactured IC, thereby incurring significant benefits in the productivity, quality and cost of IC design and manufacture.

Using systems embodying the methods introduced in the present invention, it is possible to detect, in an acceptable amount of computer run time, all potential for said mode of failure in an IC, thereby completely removing the risk of IC failure arising from said failure mode. The present invention is, as a result, of very high value to practitioners of the design and manufacture of ICs.

BACKGROUND OF INVENTION

The operation of a typical IC follows the synchronous paradigm, said synchronous paradigm implying that the timing of changes to inputs of a combinatorial logic block and the timing of observing or storing values at the output of said logic block is controlled by a periodic waveform ("clock"). In order for the IC to perform correctly, the time interval between an input change at a logic block and said logic block's output being observed or stored should be greater than the time taken for the final effect of said input change to propagate along any path in said logic block to said output. To ensure said correct operation, propagation delays on said paths are measured in an IC validation operation called timing analysis. Paths whose delays are measured using said timing analysis, said delays being appropriate to ensure correct operation, are called timed paths. Paths in said logic blocks, said paths being such that their delays are either not measured by said timing analysis or being such that their delays are greater than the nominal time interval between said input change and said output observation or storage, are called untimed paths.

A glitch is a transient value-change at a wire in a logic block. An example of a glitch in a logic block is shown in FIG. 1. Consider the AND gate G shown in FIG. 1. It has two inputs A and B, and an output C. C is connected to a flip-flop FF1 with input D and output Q. FF1 is controlled by a clock signal named CLK. FF1 is a positive-edge triggered flip-flop, which is a common form of flip-flop used in a typical IC, said term "positive-edge triggered" implying that FF1 will update its stored value to the value at input D at the time CLK changes value from 0 to 1, said value change of CLK being termed a "positive edge". The detailed operation of a flip-flop has additional nuances which are not material to the present exposition. Consider, as shown in FIG. 1, that A changes from 1 to 0 at time t1, and B changes from 0 to 1 at time t2, such that t1 is later than t2. The initial value of output C, prior to said value changes at t1 and t2, is 0. The final value of C, after said value changes at t1 and t2, is also 0. Since t1 and t2 are not identical, and t1>t2, C has a transient value of 1 between its 0 initial and final value, said transient value being shown in a waveform for C in FIG. 1. Said transient value of C is shown to occur between times t3 and t4. The phenomenon of occurrence of a transient value, as shown by example for C in FIG. 1, is called a glitch, and such a transient value is called a glitchy value. The positive edge of CLK in FIG. 1 is shown to occur at time t5. The correct operation of the logic block intends to store the final value of C in FF1. If the path from A to the input D of FF1 was timed, it would be guaranteed that t5 would be later than t4, which would cause said glitch on C to not impede the correct operation of the logic circuit. On the other hand, if said path from A to the input D of FF1 were untimed, said guaranteed would not be provided, and it would be possible for t5 to be later than t3 and prior to t4. In the event of said possibility, FF1 would store the transient value of C, causing the logic block to operate incorrectly.

A salient aspect of the glitch phenomenon is that it is dependent on the specific implementation of a logic function embodied in a logic block, rather than purely on said logic function. An example of said dependence is shown in FIG. 2. Said example is illustrative in terms of providing a first-principles understanding to practitioners of IC design of situations when transient values in a logic circuit can be functionally harmful.

In FIG. 2, 101 shows a logic block with AND gate G1, AND gate G2 and OR gate G3, with the output of G3 connected to the flip-flop FF1. Said logic block has inputs A, B and C, and the combinatorial logic has output D that is input to said flip-flop FF1. FF1 is controlled by clock CLK. The paths from C to D are timed, the path from A to D is untimed, and the path from B to D is untimed. A has a constant 1 value, C transitions from 0 to 1 at time t2, and B transitions from 1 to 0 at time t1. Assume for the purpose of said 101 example that t1 is greater than t2, which implies that B transitions to 0 after C transitions to 1. Also assume for the purpose of said 101 example that the first active edge (0 to 1 transition) after t2 of CLK is at time t3. With the values of A, B and C as shown in 101, the value of signal D is 1 prior to any transitions on the inputs, and the value of signal D is also 1 after all the effects of said input transitions have settled. The net effect of said 0 to 1 transition on signal C is to block input B at gate G2 and to enable the value of input A at gate G1 to pass through to the output F of gate G1. When said 0 to 1 transition occurs on input C at time t2, the post-transition value 1 of C determines, i.e., controls, the final value of signal G. Since the path from C to D through signal G is timed, and since C determines the final value of G on said path, t3 is guaranteed to be later than any transient values on said path. After said transition on C at time t2, the 1 value on input A propagates to the F output of gate G1. Since input A does not transition, it is the final value after said transition on C that determines the final value on signal F. Since the path from C to D through F is timed, t3 is guaranteed to be later than the time required for the value at D, as determined by the path from C to D through F, to settle down. In summary, for the logic implementation in 101, the value at D, for the values and transitions on inputs A, B and C in 101, is determined by paths originating at input C. Since said paths originating at input C are timed, D will be sampled by flip-flop FF1 only after all transient values have settled, hence ensuring that no glitch value is captured and logic functionality is not impaired. In other words, the logic implementation in 101 can be said to be glitch-free.

In FIG. 2, 102 shows an alternate implementation of the same logic function embodied in 101. The 102 implementation is different from the implementation in 101 in that gate G1 as been split into two gates, namely G4 and G5, in 102. Said split is enabled by the addition of signal B as input to gate G5 and the inverted version of signal B as input to gate G4. A practitioner of logic design will recognize the circuits in 101 and 102 are functionally identical. As for 101, the signal D in 102 will also have the value 1 prior to and after the transitions on inputs A, B and C. However, 101 and 102 exhibit different behavior with respect to transient values. The behavior of gate G6 in 102 is the same as gate G2 in 101, and any transient values on the path from C to D through gate G6 in 102 settle down prior to the arrival of the active clock edge on CLK at t3, said prior arrivals ensuring that the effects of transient values on said path are not captured by FF2 in 102. The behavior of gates G4 and G5 in 102 is different from the behavior of gate G1 in 101 with respect to transient values. The 0 to 1 transition on signal C at time t2 enables the values on both signals A and B to propagate to the outputs of G4 and G5 in 102. Since signal A has a constant value 1, it does not cause any transient values at the outputs of G4 and G5. Signal B, however, has a transition from 1 to 0 at time t1, and the effects of said transition are enabled to propagate through gates G4 and G5 once signal C transition to value 1. If the delays on paths from signal B to gates G4 and G5 are such that the effect of said transition on B arrives at the input to G4 later than at the input to G5, it is possible to have a transient condition in which the outputs of G4, G5 and G6 are all at value 0. Said transient condition will cause the output of G7 to become 0, causing signal D in 102 to have a transient value of 0 between times t4 and t5 as shown in FIG. 2. Since said transient value on D is caused by signal B, and since the paths from B to D are not timed, it is possible for the active edge on clock CLK at t3 in 102 to arrive prior to the settling of said transient value on D at t5. Said prior arrival of the active clock edge will cause flip-flop FF2 in 102 to capture said transient value on D rather than the intended final value. In other words, the glitch value will be captured in FF2, causing the logic function to behave erroneously.

In summary, FIG. 2 illustrates lucidly that the specific logic circuit implementation of a logic function determines whether a logic block has potential for glitch failure. In a typical IC design process, an initial description of logic functionality is transformed by means of a series of steps, said steps collectively termed "synthesis" by IC design practitioners, into a final representation of logic functionality in terms of logic gates and storage elements, flip-flops and latches being examples of said storage elements, said final representation being called a "netlist", following which the placement, routing, mask-creation and fabrication steps are carried out, said following steps not changing the logic circuit implementation of logic blocks in the IC. FIG. 3 illustrates said steps in IC design, highlighting that the process arrives at a final netlist representation before further steps are carried out. Since a netlist is the final version of logic circuits in the IC, and since the potential for glitch failure is dependent on logic circuit implementation, it is imperative that the final netlist be checked for glitch-failure potential before an IC is manufactured. Said final netlist in an IC is likely to have millions of points of potential glitch failure that must be checked prior to IC manufacture, making sign-off-level detection of glitch failures, said sign-off-level detection implying that all likely glitch-failures are detected (100% recall) and very few false failures are reported (high precision), in acceptable computer run time very challenging. It is in this background and context that the present invention proposes methods for efficient sign-off-level detection of glitch failures in large netlists. Said methods are extremely beneficial in the practice and commercial success of IC design.

As previously stated in the present disclosure, glitch failures occur on untimed paths, said untimed paths being present in an IC as a consequence of a number of common design patterns. One of said design patterns is an asynchronous clock-domain crossing, as shown in FIG. 4. CLK1 and CLK2 in FIG. 4 are clock signals and are asynchronous to each other. Said asynchronous relationship implies that time intervals between the value-transitions on CLK1 and CLK2 cannot be obtained deterministically, said lack of determinism making it impossible to time the paths between pairs of flip-flops such that one flip-flop in the pair is controlled by CLK1 and the other by CLK2. When a clock signal controls the time at which a flip-flop's stored value is updated, said flip-flop is termed as belonging to said signal's clock-domain. In FIG. 4, flip-flop FF1 belongs to the CLK1 clock domain, and FF2 belongs to the CLK2 clock domain. Since CLK1 and CLK2 are asynchronous to each other, any path starting at FF1 and ending at FF2 is untimed. G8 in FIG. 4 is a multiplexor logic circuit, which is functionally equivalent to the logic circuits in 101 and 102 of FIG. 2. If G8 in FIG. 4 were implemented as the circuit in 102 in FIG. 2 with gates G4, G5, G6 and G7, with input B of G8 corresponding to signal B in 102, a transition on signal Q1 in FIG. 4 could cause a transient value on the untimed path from Q1 to D2 in FIG. 4, creating the potential for glitch failure. Untimed paths due to asynchronous clock-domain crossings are by far the majority of untimed paths in an IC.

Another source of untimed paths in an IC are paths that are explicitly specified to be timing exceptions, i.e., they are purposely left untimed. A reason for said leaving paths purposely untimed is generally that the logic circuit in said paths is complex and requires more than one clock cycle to evaluate. An example of a timing exception is shown in FIG. 5. Said example is essentially similar to the example in FIG. 4, except that there is no asynchronous clock-domain crossing. All flip-flops in FIG. 5 are controlled by the same clock CLK. The paths between flip-flops FF1 and FF2 in FIG. 5 are purposely left untimed because the logic circuit "L" is very complex, said complexity causing L to require more than one clock period of CLK to complete an evaluation. Gate G9 in FIG. 5 is a multiplexor equivalent in logic functionality to the logic circuits in 101 and 102 of FIG. 2. If G9 were to be implemented as gates G4, G5, G6 and G7 in 102 of FIG. 2, and input B2 of G9 were analogous to signal B of 102 of FIG. 2, a transition on Q1 in FIG. 5 could cause a transient value change at D2 in FIG. 5, causing a glitch failure on the untimed path from said Q1 to said D2.

In addition to asynchronous clock-domain crossings and timing exceptions, untimed paths also occur in an IC due to reset signals, power management signals etc.

Said reset signals are intended to initialize flip-flops to a predetermined value. A specialized flip-flop termed "asynchronous reset flip-flop" has an input port, said port termed "reset port", to which said reset is connected. When said reset signal connected to said reset port a flip-flop is asserted, said flip-flop assumes the predetermined initialization value, said initialization value superseding any value currently stored in the flip-flop or being provided as input on the data-input port of said flip-flop. A flip-flop without an asynchronous reset port is termed a "synchronous reset flip-flop". A reset signal initializes a synchronous reset flip-flop by asserting the initial value through the data input of said flip-flop. In asynchronous reset flip-flops as well as synchronous reset flip-flops, the operation of the reset signal is essential for correct operation of an IC. Reset signal paths through a reset port of an asynchronous reset flip-flop are usually untimed. As a result, a glitch during reset assertion on a reset port of an asynchronous reset flip-flop can cause malfunction in logic downstream from said flip-flop.

Said power-management signals are intended to dynamically turn off or turn on a logic circuit in an IC by turning on or turning off power or clock signals to said logic circuit. Said power management signals also ensure that when a logic circuit is turned on, flip-flops in said logic circuit are in a desired initial state. Paths involving said power-management signals may be untimed, in which case glitches on said paths are likely to cause malfunction in a logic circuit to which said power-management signals are connected.

As a result of potential of IC failure due to glitches on said reset and said power-management signals, detection of likely glitch failure prior to IC manufacture is essential in these cases as well.

Prior Art

The glitch phenomenon has been well documented in prior art. Articles by Yoeli et al., Eichelberger et al. and Beister et al. cited in the present disclosure provide comprehensive coverage of the phenomenon and methods for modeling hazards and glitches, said models being used for the analysis of hazards and glitches in simulation or static analysis. Said articles also highlight that the awareness of the glitch phenomenon dates back at least to 1964. A recent article by Kung, said article cited in the present disclosure, proposed a more efficient model (termed "Kung's Algebra") for glitch analysis. A subsequent article by Jeong et al., said article cited in the present disclosure, presented an enhanced algorithm for more efficient glitch analysis based on Kung's Algebra. U.S. Pat. No. 9,721,057 was granted for performing clock-domain crossing verification at the netlist level based on a prior clock-domain crossing verification of the same design at the RT level. Said patent includes glitch checking at the netlist level as part of clock-domain crossing verification, but does not propose any enhancements to known glitch checking methods. Similarly, U.S. patent application 2018/0225400 suggests the need for glitch checking on paths in asynchronous clock-domain crossings, but does not propose any enhancements to known glitch checking methods. In fact, said U.S. Pat. No. 9,721,057 and patent application 2018/0225400 seem to apply methods already well known in prior art for the task of glitch checking. U.S. Pat. No. 4,787,062 enhances logic simulation by highlighting in said simulation the occurrence of a glitch at a signal in a design being simulated, said highlighting being done by forcing said signal to a simulation value representing an unknown. Similarly, U.S. patent application 2014/0325463 proposes another method for highlighting in logic simulation the occurrence of a glitch, said method being based on forcing a glitch on clock signals associated with potentially glitchy logic. U.S. Pat. No. 6,377,065, and U.S. patent application 2007/0165838 and U.S. patent application 2013/0129116 are examples of numerous proposals in prior art for detecting glitches through hardware circuit techniques in manufactured integrated circuits. U.S. Pat. No. 6,324,679 and U.S. patent application 2005/0270073 are examples of numerous proposals in prior art for integrated circuit design methods for reducing the number of transient events in an integrated circuit, said reduction being desired, for example, for reducing power consumption in said integrated circuit.

The above cited prior art is the closest in terms of association with the glitch phenomenon in integrated circuits, and does not in any manner impinge on the present invention or anticipate the novel methods proposed herein, said methods being targeted toward enhancing the efficiency of static analysis for glitch checking prior to the manufacture of extremely-large scale integrated circuits.

SUMMARY OF INVENTION

The present invention in its various embodiments enables a software tool or computer system to perform glitch checking rapidly on an entire integrated circuit comprising a very large number of logic circuits on which said glitch checking must be carried out, said glitch checking being performed prior to manufacture of said integrated circuit. A representative diagram of said software tool or computer system for glitch analysis is shown in FIG. 6. The input to the glitch analysis system in FIG. 6 is 601, consisting of a netlist, description of clocks and constraints associated with said netlist, and, optionally, a list of paths in said netlist to be considered as untimed paths. Said glitch analysis system first identifies all untimed paths in said input netlist (602). Said untimed paths (603) are analyzed by a glitch analysis engine (604) to produce a list of paths likely to have glitch failure (605), said list of paths being provided to an integrated circuit designer or verification engineer by means of a debug system (606), said debug system being used to facilitate correcting said glitch failures.

The present invention overcomes, by means of methods embodied in said glitch analysis engine (604) of FIG. 6, the disadvantages of prior art in terms of ability to determine, with 100% recall and very high precision, glitch failures in an acceptable computer-processing time for extremely large integrated circuits. Further details of said glitch analysis engine are shown in FIG. 7.

The input to the glitch analysis engine of FIG. 7 is a set of untimed paths ("original set") on which glitch analysis is to be performed (701). The analysis engine first determines (shown as 702) a maximally-unique candidate set of said untimed paths (703) such that glitch analysis results on said unique candidate set can be mapped to said original set of untimed paths. Next, a glitch classifier (704) separates said unique glitch-candidates into two subsets, said subsets being such that the glitch candidates in the first subset (706) can efficiently be determined to be free of glitch failure potential and the glitch candidates the second subset (705) can efficiently be determined to have a high likelihood of glitch failure. Said classification is performed based on the type of glitch possible for each glitch candidate. The type of glitch possible for the subset of candidates in 706 is termed "Type 1 Glitch", and the type of glitch possible for the subset of candidates in 705 is termed "Type 2 Glitch". 707 performs Type 1 glitch analysis on the candidates in 706 and determines the subset of said candidates that are guaranteed not to have glitch failure potential (709). Similarly, 708 performs Type 2 glitch analysis on the candidates in 705 and determines the subset of said candidates that have a high likelihood glitch failure potential (710). Candidates from 706 that cannot be conclusively determined to be free of glitch failure potential, and candidates from 705 that cannot be determined to have a high likelihood of glitch failure potential are included in subset 711 termed "Potential Fail". The "Potential Fail" candidates in 711 are analyzed further (712) to determine whether said candidates are conclusively free of glitch-failure potential or have a likelihood of glitch failure, said analysis being termed "Type 3 Glitch Analysis". From said candidates, the ones that are determined to pass are added to 709, and the ones that are determined to have a likelihood of failure are added to 710. The failing candidates in 710 are further analyzed in 713 to determine a unique subset (714) of said failing candidates such that a debug of the untimed paths with glitch-failure potential in 714 provides comprehensive understanding of the causes of glitch-failure potential for all failing candidates in 713. Said unique failing untimed paths in 714 are debugged by a verification engineer by means of a Debug System (715) that provides detailed information in an intuitive manner to said engineer about each failing untimed path.

The efficiency of the glitch analysis engine shown in FIG. 7, and the resulting high-throughput of said engine in analyzing a large number of untimed paths for glitch-failure potential, is owed to the following two reasons: (1) the initial reduction of the number of glitch candidates in 702, and (2) the subsequent fast classification in 704 of glitch candidates into Type 1 glitch and Type 2 glitch. The number of unique candidates in 703 is very significantly reduced relative to the number of untimed paths input (701) to the Glitch Analysis Engine, said reduction being greater than 10× in practice. The Type 1 and Type 2 classification of glitch potential allows custom analysis engines to be applied to the Type 1 subset 706 (707) and to the Type 2 subset 705 (708). The customized engines are able to determine the conclusively glitch-free subset of 706, and the high-likelihood glitch-failing subset of 710 much faster than a general-purpose glitch analysis engine. The number of candidates in the Potential Fail subset (711) is, in practice, much smaller than the initial number of candidates in 703. Further, the Potential Fail candidates in 711 have characteristics that are amenable to further-customized glitch analysis. Consequently, the Type 3 Glitch Analysis (712) is able to determine the pass/fail classification of said Potential Fail candidates (711) extremely rapidly.

As a further benefit, said candidate compression (702), glitch classification (704) and unique-failure identification (713) allow the Debug System (715) to present the potential for glitch failure in an integrated circuit to a verification engineer in a focused and informed manner in terms of the much reduced number of actionable items said engineer is required to review, and in terms of an enhanced ability to focus on the root-cause of a glitch failure.

Additional description of the components of the Glitch Analysis Engine of FIG. 7, and various embodiments of said components, is presented in the detailed disclosure, said additional description having sufficient detail for a practitioner of the art to implement said Glitch Analysis Engine in a straightforward manner.

DESCRIPTION OF THE FIGURES

FIG. 1: Glitch Example
FIG. 2: Example Showing that Glitch is Logic-Structure Dependent
FIG. 3: Outline of Major Steps in Integrated Circuit Realization
FIG. 4: Untimed Path Due to Asynchronous Clock-Domain Crossing
FIG. 5: Untimed Path Due to Multi-Cycle Exception
FIG. 6: System for Large-Scale Glitch Analysis
FIG. 7: High-Throughput Glitch Analysis Engine
FIG. 8: Example Showing a Pair of Isomorphic Logic Circuits
FIG. 9: Example of Glitch-Free Non-Unate Logic Cone

DETAILED DESCRIPTION OF THE INVENTION

A description of the invention including the various methods and systems therein and some embodiments thereof is provided in this section in sufficient detail that a person skilled in the art would be able to reproduce them. The description herein is also sufficiently general to enable skilled practitioners to realize straightforward variations and derivations. As such, this description must be interpreted in the widest scope possible.

A key step in the Glitch Analysis Engine of FIG. 7 is a Glitch Candidate Compressor (702) that reduces the original candidate set of untimed paths (701) to a subset consisting of unique glitch candidates (703). In one of the embodiments of said Glitch Candidate Compressor, said reduction of the candidate set is performed using isomorphism analysis. Two untimed paths in 701 are deemed to be isomorphic if the combinational logic driving the output of a first untimed path is identical to the combinational logic driving the output of a second path except for different names of inputs and internal wires in said logic, and ignoring buffers and inverter-pairs in either logic. An example of a pair of paths considered isomorphic in the aforementioned manner is illustrated in FIG. 8. The logic circuits 801 and 802 are considered isomorphic. The buffer G5, and the inverter pair G6 and G7, in 802 are ignored. For each set of untimed paths in 701 such that said untimed paths are isomorphic, only one untimed path from said subset is added to the Unique Glitch Candidates set (703). Algorithms for isomorphism analysis of graphs are well known in prior art and familiar to practitioners of computer science, one of the earliest being the paper by Ullmann cited in this disclosure. The present invention is not limited to a specific isomorphism analysis algorithm. Said algorithm may be chosen for highest efficiency and suitability of implementation. The present invention applies numerous heuristics for higher efficiency. The Glitch Classifier (704) is another key step in the Glitch Analysis Engine of FIG. 7. In one embodiment, said glitch classification is performed in the following manner:

a logic cone in 703 such that all untimed paths that are glitch candidates in said logic cone have the same single input, said input also being called "driver", is termed a Type 1 glitch candidate and included in 706;

a logic cone in 703 such that glitch-candidate untimed paths in said logic cone have more than one driver input is termed a Type 2 glitch candidate and included in 705.

For example, consider the logic cone 801 in FIG. 8. If the paths from A1 to D1 and from B1 to D1 are timed, and the paths from C1 to D1 are untimed, the logic cone 801 will be included as a Type 1 glitch candidate in 706 with C1 as the single driver-input. On the other hand, if the paths from C1 to D1 are timed, and the paths from A1 to D1 and from B1 to D1 are untimed, the logic cone 801 will be included as a Type 2 glitch candidate in 705 with A1 and B1 as the two driver-inputs.

The next step is type-specific glitch analysis. Type 1 glitch analysis is performed in 707, and Type 2 glitch analysis is performed in 708, in the Glitch Analysis Engine of FIG. 7.

In a preferred embodiment of 707, the glitch analysis method first checks whether any reconvergence of paths from a single-driver is such that said reconverging paths have differing inversion parity (odd for one reconverging path and even for another), a single-driver logic cone with no reconverging paths with differing inversion parity from said single-driver being termed a "unate" logic cone. In said preferred embodiment of 707, all single-driver glitch candidates deemed unate are further included in 709 as being glitch-free. For example, in the logic cone 801 of FIG. 8, the two paths from Cl reconverging at gate G31 have different inversion parity because of inverter G41. As a result, logic cone 801 would not bee deemed to be glitch free if the paths from Cl to D1 are untimed. In the absence of G41, said paths would have the same inversion parity and logic cone 801 would be deemed unate and glitch-free. The unate-check is very efficient and eliminates a large number of glitch candidates from consideration for further analysis, hence contributing to the efficiency of the overall Glitch Analysis Engine in FIG. 7. In said preferred embodiment of 707, glitch candidates deemed non-unate are further analyzed for glitch potential. When glitch generation or propagation is blocked by timed paths, a logic cone is deemed to be glitch free. When glitch generation and propagation is not blocked, the candidate is deemed to have potential for glitch failure and is added to 710 in the Glitch Analysis Engine of FIG. 7. For example, consider the logic cone 901 in FIG. 9. Consider that the paths from C to D are untimed, and the paths from A to D, B to D, and H to D are timed, said timed and untimed path characteristics deem logic cone 901 to be a single-driver glitch candidate. Note that paths from C reconverge at gate G51 with different inversion parities, making the glitch candidate non-unate, said non-unateness making it necessary to perform further functional-sensitization analysis on the glitch candidate. Said further analysis reveals that even though paths from C reconverge at G51 with different inversion parities, functional effects of said reconvergence are gated by timed paths from H to D, further determining that said timed paths from H to D block any effects of the reconverging paths from C at G51 from determining the value stored in flip-flop FF1, thereby making the logic cone 901 glitch free. Said further analysis is performed using a variant of the well known Kung's algebra cited in the present disclosure, thereby being familiar to a practitioner of the art. The contribution of the present invention is that said further analysis based on a variant of Kung's algebra is only applied to a subset of single-driver glitch candidates not already determined to be glitch-free based on the aforementioned unateness check. The cumulative filtering out of glitch candidates based on isomorphism analysis, single-driver vs. multi-driver classification and unateness checking allows the expensive said functional-sensitization analysis to need to be applied to only a small number of glitch candidates, thereby making the overall Glitch Analysis Engine of FIG. 7 very efficient, the achievement of said efficiency being the seminal contribution of the present invention.

Type 2 glitch analysis in 708, in a preferred embodiment, is performed in a similar manner as the aforementioned functional-sensitization analysis based on a variant of the well-known Kung's algebra, with the further customization for Type 2 glitch candidates that the analysis only allows for glitch effects caused by transitions at more than one input driver, said customization being termed "multi-driver analysis". Customizing for Type 2 glitch candidates in said manner simplifies the analysis, allowing a large number of multi-driver candidates to be processed in a short time to determine glitch-failure potential. A multi-driver glitch candidate that is determined to have a potential glitch caused by transitions emanating at more than one input driver and able to propagate said glitch to the output of said candidate is deemed to have a potential for glitch failure and is added to 710 in the Glitch Analysis Engine of FIG. 7. Type 2 glitch candidates whose glitch generation or propagation is determined by said multi-driver analysis to be blocked, might still have potential for glitch failure caused by transitions emanating at individual drivers, said candidates therefore being added in the Glitch Analysis Engine of FIGS. 7 to 711 as potentially failing candidates. In 712, the method of 707 consisting of efficient single-driver analysis is applied to all of the individual input-drivers for each of the multi-driver candidates in 711 such that a candidate is deemed to have glitch failure potential if a glitch can be generated and propagated due to any one of its individual input-drivers. A multi-driver candidate in 711 such that no glitch can be caused by any of its individual input-drivers is deemed to be free of glitch potential and added to 709 as a passing glitch candidate. All remaining candidates in 711 are added to 710 as failing glitch candidates. Customized analysis of single-driver and multi-driver cases enables a significant enhancement of analysis efficiency, allowing a much larger number of glitch candidates to be processed in a given amount of computer processing time relative to the best know methods in prior art.

Finally, in the Glitch Analysis Engine of FIG. 7, 713 determines the unique failing candidates by, in a preferred embodiment, applying the isomorphism analysis method in the aforementioned embodiment of 702 on the failing untimed paths stored in 710, said isomorphism analysis being limited to gates on said untimed paths and ignoring side inputs to said untimed paths, said side inputs driving inputs to gates on said untimed paths, but not being on said untimed paths themselves.

In some embodiments of the present invention, parallel execution is performed using a combination of multiple threads and multiple processes in the various stages of the Glitch Analysis Engine of FIG. 7. For instance, in some embodiments, the aforementioned analysis steps in 707, 708 and 712 are performed in parallel on the individual glitch candidates said analysis steps operate on.

What is claimed is:

1. A method for detecting potential for glitch failures in a digital integrated circuit, said method being embodied as a set of computer instructions stored on computer readable media, said computer instructions, when loaded into a computer, causing the computer to perform the steps of said method, said detection being performed on a model of said digital integrated circuit to be fabricated, said model comprising a multiplicity of combinational logic circuits, each of said logic circuits having a multiplicity of inputs and one output, each of said inputs and output taking either the logic value 0, or the logic value 1, or a symbolic value indicating logic value transition from 0 to 1, or a symbolic value indicating logic value transition from 1 to 0, said detection being performed for the purpose of ensuring error-free operation of said digital integrated circuit to be fabricated, the method comprising:

analyzing, for each of said logic circuits, whether any path from an input of said logic circuit to the output of said logic circuit has the characteristic that its delay is either unmeasured or that the amount of said delay would cause a value change from said input to propagate to said output later than the time at which said output value change is intended to be observed or intended to be captured in a storage element connected to said output, a path with said characteristic being termed an untimed path;

classifying any logic circuit from said multiplicity of logic circuits to be free of glitch failure if said logic circuit has no untimed path;

determining from said multiplicity of logic circuits in said integrated circuit model a subset of logic circuits, each logic circuit in said subset having untimed paths that all emanate from a single input of said logic circuit, said subset being termed single-driver logic cones;

determining a subset of said single-driver logic cones, each logic circuit in said subset having no pair of untimed paths that converge with different inversion parity, said subset being termed single-driver glitch-free logic cones, and classifying each logic circuit in said subset to be free of glitch failure;

determining a subset of said single-driver logic cones, each logic circuit in said subset not belonging to said single-driver glitch-free logic cones, terming said subset single-driver potentially-glitchy logic cones;

determining from said multiplicity of logic circuits in said integrated circuit model a subset of logic circuits, each logic circuit in said subset having more than one input from which untimed paths emanate, said subset being termed multi-driver logic cones;

performing Boolean analysis for each logic circuit in said multi-driver logic cones to determine if logic value transitions on two or more inputs to said logic circuit can simultaneously propagate along untimed paths in said logic circuit to the output of said logic circuit, said logic circuit being classified as having potential for glitch failure if said simultaneous propagation is determined to be possible, said logic circuit being termed multi-driver glitchy logic cone, otherwise said logic circuit being termed multi-driver glitch-free logic cones if said simultaneous propagation is deemed to not be possible;

optionally removing from said multi-driver glitch-free logic cones any logic circuit that does not have two untimed paths emanating from a single input to said logic circuit, said two untimed paths converging with different inversion parities;

performing Boolean analysis for each logic circuit in said single-driver potentially glitchy logic cones or in said multi-driver glitch-free logic cones to determine if logic value transitions on a single input to said logic circuit can simultaneously propagate along two or more untimed paths in said logic circuit to the output of said logic circuit, at least two of said two or more untimed paths converging with different inversion parity, said logic circuit being classified as having potential for glitch failure if said simultaneous propagation is determined to be possible, said logic circuit being termed single-driver glitchy logic cone, otherwise said logic circuit being termed glitch-free if said simultaneous propagation is deemed to not be possible;

reporting all logic circuits from said multiplicity of logic circuits in said integrated circuit model, which are not determined to be glitch free, as erroneous logic circuits requiring correction, said erroneous logic circuits being termed glitchy logic cones;

and, if all logic circuits from said multiplicity of logic circuits in said integrated circuit model are determined to be glitch free, providing said error-free integrated circuit model to a fabrication facility to fabricate an error-free integrated circuit.

2. The method of claim 1 in which said multiplicity of logic circuits in an integrated circuit model are partitioned into isomorphism-based subsets, each said subset consisting of one or more of said logic circuits, all combinational logic circuits in a said subset being identical to each other in terms of logic gates and connectivity of said logic gates except for buffers, or buffer-equivalents, or pairs of inverters, the output of one of the inverters in each of said pairs being connected only to the input of the second of the inverters in said pair, or the output of one of the inverters in said pair being connected only to a chain of buffers or buffer-equivalents, said chain of buffers or buffer-equivalents only connected to the input of the second of the inverters in said pair, said detection of glitch failure only being performed on one logic circuit per said subset, the result of said detection on said one logic circuit being applied to all logic circuits in said subset.

3. The method of claim 2 in which, if a logic circuit with glitch failure is detected in one of said isomorphism-based subsets, only one logic circuit in said subset is reported directly, the remaining logic circuits in said subset being reported only on demand.

4. The method of claim 1 in which said glitchy logic cones are partitioned into on-path-isomorphism based subsets, each said subset consisting of one or more of said glitchy logic cones, all combinational logic circuits in said subset being identical to each other in terms of the logic gates and connectivity of said logic gates except for buffers or buffer-equivalents and pairs of inverters, the output of one of the inverters in each of said pairs being connected only to the input of the second of the inverters in said pair, or the output of one of the inverters in said pair being connected only to a chain of buffers or buffer-equivalents, said chain of buffers or buffer-equivalents only connected to the input of the second of the inverters in said pair, said logic gates constituting specific untimed paths in said logic circuits, said untimed paths being the paths along which logic transition values on inputs propagate to outputs of said logic circuits causing glitch failure.

5. The method of claim 4 in which, from each of said on-path-isomorphism based subsets, reporting only one logic circuit as a representative glitch failure and reporting the remaining logic circuits in said subset as related to said representative logic circuit, said related logic circuits being reported only on demand.

6. The method of claim 1 in which said single-driver logic cones, multi-driver logic cones, single-driver glitchy logic cones and multi-driver glitchy logic cones are reported separately.

7. The method of claim 1 in which constraints are specified on signals in said IC model, said constraints specifying, for each of said logic circuits being analyzed, pairs of inputs to said logic circuit, inputs in each said pair not being allowed to transition simultaneously.

8. The method of claim 1 in which said detection of potential for glitch failure is only performed under specific conditions on inputs to said logic circuits, said conditions being such that the output of each said logic circuit remains unchanged despite logic value transitions on some inputs to said logic circuit.

9. The method of claim 8 in which said specific conditions are provided by a user of a system embodying said method.

10. The method of claim 1 in which said multiplicity of logic circuits is partitioned into a multiplicity of groups, said groups being analyzed concurrently using parallel execution on one or more compute servers for potential for glitch failure.

11. The method of claim 1 in which said logic circuits and said paths to analyze for potential for glitch failure are specified by a user of a system embodying said method.

12. The method of claim 1 with said logic circuits, in which the output of a logic circuit being analyzed for potential for glitch failure controls the propagation or operation of a clock signal.

13. The method of claim 1 with said logic circuits, in which the output of a logic circuit being analyzed for potential for glitch failure controls the propagation or operation of a reset signal.

14. The method of claim 1 with said logic circuits, in which the output of a logic circuit being analyzed for potential for glitch failure controls the propagation of the effect of a reset signal.

15. The method of claim 1 with said logic circuits, in which the output of a logic circuit being analyzed for potential for glitch failure is used for power-management control.

16. The method of claim 1 with said logic circuits, in which the output of a logic circuit being analyzed for potential for glitch failure is the final or intermediate output of a path specified to be a timing exception.

* * * * *